United States Patent [19]

Budzich

[11] Patent Number: 4,534,860

[45] Date of Patent: Aug. 13, 1985

[54] WATER-OIL SEPARATING SYSTEM FOR USE WITH CENTRIFUGAL TYPE SEPARATOR

[76] Inventor: Tadeusz Budzich, 80 Murwood Dr., Moreland Hills, Ohio 44022

[21] Appl. No.: 629,907

[22] Filed: Jul. 11, 1984

[51] Int. Cl.³ .......................... B01D 33/04; B04B 9/06

[52] U.S. Cl. .................................... 210/137; 210/167; 210/354; 210/377; 494/36; 494/49; 494/901

[58] Field of Search ............... 210/114, 116, 143, 167, 210/182, 187, 259, 354, 360.1, 377, 787, 137; 494/35, 36, 49, 901

[56] References Cited

U.S. PATENT DOCUMENTS

| | | | |
|---|---|---|---|
| 2,723,079 | 11/1955 | Fulton et al. | 494/49 X |
| 2,755,992 | 7/1956 | Tait et al. | 494/49 |
| 2,792,172 | 5/1957 | Tait | 210/167 X |
| 3,140,257 | 7/1964 | Wilder, Jr. et al. | 210/114 X |
| 3,189,180 | 6/1965 | Scott et al. | 210/259 X |
| 3,368,681 | 2/1968 | Kasten | 210/114 |
| 3,784,092 | 1/1974 | Gibson | 494/49 X |
| 4,046,315 | 9/1977 | Klingenberg et al. | 494/36 X |
| 4,081,373 | 3/1978 | Rozniecki | 210/114 |
| 4,165,032 | 8/1979 | Klingenberg | 494/49 |
| 4,221,323 | 9/1980 | Courtot | 494/49 X |
| 4,230,581 | 10/1980 | Beazley | 494/49 X |
| 4,264,442 | 4/1981 | Jackson | 210/114 X |
| 4,406,651 | 9/1983 | Dudrey et al. | 210/377 X |
| 4,492,631 | 1/1985 | Martin | 210/354 X |

*Primary Examiner*—Robert Spitzer

[57] ABSTRACT

A centrifugal filter separator system operable to separate from oil under pressure solid contaminants, by depositing them on the internal wall of a rotating drum, powered by reaction jet nozzles, while also separating water from oil and extracting it from the rotating drum through a water extraction circuit. A water-oil mixture from the water extraction circuit is passed through a pressurized gravity type separator, from which the separated oil is returned, on a continuous basis, back to the centrifugal filter separator, while the water is retained in the gravity type separator. Flow of the mixture of water and oil through the extraction circuit is regulated in respect to change of viscosity of the extracted liquid, but relatively independent of pressure within the rotating drum for maximum efficiency of the gravity type separator.

12 Claims, 4 Drawing Figures

WATER-OIL SEPARATING SYSTEM FOR USE WITH CENTRIFUGAL TYPE SEPARATOR

BACKGROUND OF THE INVENTION

This invention relates generally to improvements in centrifuges for cleaning liquids.

In more particular aspects this invention relates to oil cleaners of centrifuge type, in which a drum, into which oil under pressure is fed, is mounted in bearings for rotation within a housing and is rotated about a vertical axis by the reaction of oil jets from nozzles rotating with the drum.

In still more particular aspects this invention relates to centrifugal-filter separators, based on the principle of Hero's engine, in which the oil contaminants in the oil collect on the inner surface of the rotating drum together with water, which is removed from the rotating drum through the extraction mechanism located on the drum shaft.

In still more particular aspects this invention relates to the water extraction mechanism, of a centrifugal filter based on the principle of Hero's engine, which extraction mechanism is capable of separating the centrifuged water-oil mixture, retaining the water outside of the rotating drum and returning the separated oil back to the system reservoir.

Centrifugal oil filters, using a rotating drum, powered by the reaction of oil jets, are well known in the art. In such filters incoming oil is subjected to very high centrifugal forces, resulting in separation of solid contaminants and water. During operation of the filter the water can be removed from the space adjacent to the inner surface of the drum, by the water conducting tubes, communicating with the hollow shaft. If a certain maximum quantity of the centrifuged water is allowed to collect in the rotating drum, the centrifugal filter loses its effectiveness in a continuous fashion bypassing the additional centrifuged water. If the water is extracted from a thin layer, collected at the inner surface of the rotating drum, the water conducting tubes, during the water ejection process, pass a water-oil mixture, resulting in a comparatively large loss of oil. Since it is very difficult to determine the quantity of water, at a time, centrifuged within the rotating drum, it is very difficult, if not impossible to efficiently drain the water without losing significant quantities of oil in the process. While operating the centrifugal oil filter for a prolonged period the loss of oil through the water extraction circuit may eventually drain the system reservoir, make the system inoperative and may result in damage to the system components, like for example system pump.

SUMMARY OF THE INVENTION

It is therefore a principal object of this invention to provide a centrifuged water extraction device, which will separate the extracted water-oil mixture into water and oil, retain the water outside of the centrifugal filter and return the oil back into the centrifugal filter system.

Another object of this invention is to provide a centrifuged water extraction device, which would extract, on a continuous basis, small quantities of oil-water mixture, retain the water outside of the centrifugal filter and return the oil, on a continuous basis, into the centrifugal filter system.

It is another object of this invention to provide a centrifuged water extraction device, which includes a gravity type separator, separating the extracted oil-water mixture into oil and water, retaining the water within the gravity type separator and returning the oil back to the centrifugal filter system.

It is a further object of this invention to regulate the rate of flow through the water extraction mechanism in such a way that the water-oil separation can take place in the most efficient manner.

It is still a further object of this invention to provide a centrifuged water extraction device, from which the accumulated water could be discharged into a water container without significant loss of oil.

It is still a further object of this invention to control the viscosity of the liquid, within the gravity type separator, for optimum efficiency of water-oil separation.

Briefly the foregoing and other additional advantages of this invention are accomplished by providing a novel centrifuged water extraction device from the rotating drum of a centrifugal filter, based on the principle of Hero's engine, which in a continuous fashion regulates the rate of flow of water-oil mixture from the inner surface of the drum, to obtain the optimum separation condition of water from oil in a gravity type separator, retains the water outside of the centrifugal filter system, while returning the oil back to the centrifugal filter system.

Additional objects of this invention will become apparent when referring to the preferred embodiments of the invention as shown in the accompanying drawings and described in the following detailed description.

DESCRIPTION OF THE PREFERRED EMBODIMENTS

Figure 1:
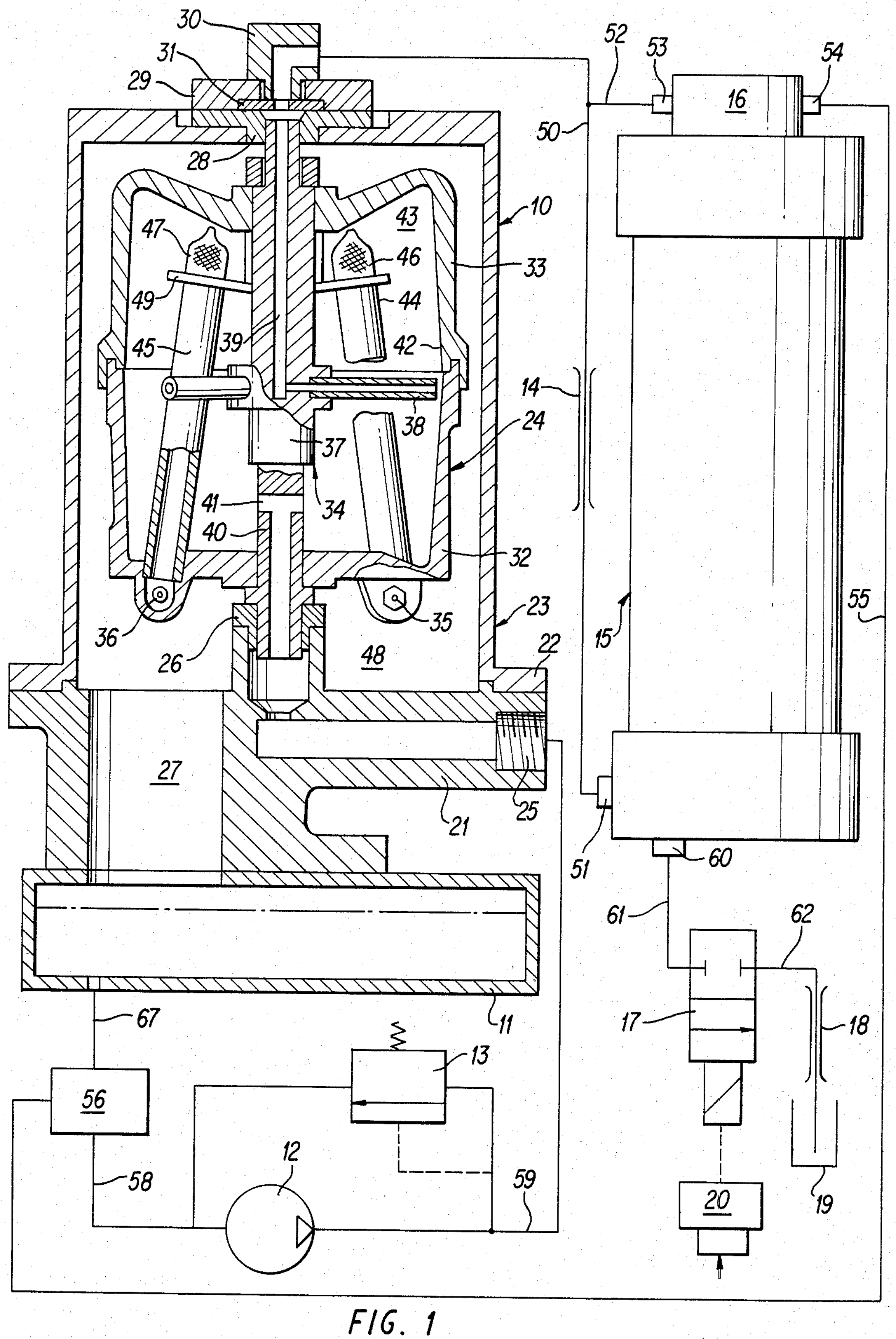
FIG. 1 is a sectional view through the centrifugal filter and reservoir with diagrammatically shown gravity type separator with the system pump, system pump relief valve, solenoid operated ejection valve, electrical push button control and connecting lines shown schematically.

Referring now to FIG. 1, a centrifugal filter separator assembly, generally designated at 10, is shown mounted on system reservoir 11 and supplied with pressure oil, from schematically shown pump 12, provided with a conventional relief valve 13. The centrifugal filter separator assembly 10 is integrated into a water-oil separation and recovery circuit, consisting of viscous resistance 14, gravity separator, generally designated as 15, which includes a pressurizing and oil bypass valve 16 and a water rejection circuit, consisting of an on-off solenoid valve 17, connected through viscous resistance 18 to a water vessel 19 and operated by a conventional push button control 20. The centrifugal filter separator 10 comprises a base 21 and a cover 22, forming together a housing, generally designated as 23, which mounts on the vertical axis a drum assembly, generally designated as 24. The base 21 is provided with inlet 25, conducting oil under pressure to a lower internal bearing 26 and an oil outlet 27. The cover 22 is provided with an upper internal bearing 28, secured in place by plate 29, mounting centrifuged water extraction fitting 30. A reaction washer 31, provided with an oil passage, is retained between the upper internal bearing 28 and the plate 29. The drum assembly, generally designated as 24, includes a lower cup 32 and an upper cup 33, secured together, in sealing engagement, by a shaft assembly, generally designated as 34. The lower cup 32 is provided with two reaction jet nozzles 35 and 36. The shaft assembly 34 is provided with a water extraction device 37, provided with water extraction tubes 38, communicating with an internal passage 39, provided in a shaft 40. The shaft 40 is provided with oil inlet passage 41, communicating the inlet 25 with internal space 43 of the drum assembly 24 and internal passage 39, communicating the water extraction tubes 38, of the water extraction device 37, with the centrifuged water extraction fitting 30. The water extraction tubes 38 are extending towards and located in proximity of the internal surface 42, of the drum assembly 24. The pressure oil, from internal space 43 of the drum assembly 24, is conducted through the inlet tubes 44 and 45, provided with strainers 46 and 47, to the reaction jet nozzles 35 and 36, which communicate directly with internal space 48, connected by oil outlet 27 with the reservoir 11. A flat spring 49 maintains inlet tubes 44 and 45 in contact with the lower cup 32 and in communication with the reaction jet nozzles 35 and 36. The centrifuged water extraction fitting 30 is connected by line 50 and viscous resistance 14 to port 51, of the gravity type separator 15, while also being connected by line 52 to port 53, of pressurizing and oil bypass valve 16. The pressurizing and oil bypass valve 16 is connected by port 54 and line 55 to the oil injection fitting 56, connected by line 57 to the reservoir 11 and by line 58 to the pump 12. The output of the pump 12 is connected by line 59 to inlet 25 of the centrifugal filter separator assembly 10. The gravity type separator 15 is connected through the water discharge port 60 and line 61 to the on-off solenoid valve 17, responsive to a signal from the push button control 20 and operable to conduct water through line 62 and viscous resistance 18 to the water vessel 19.

Figure 2:
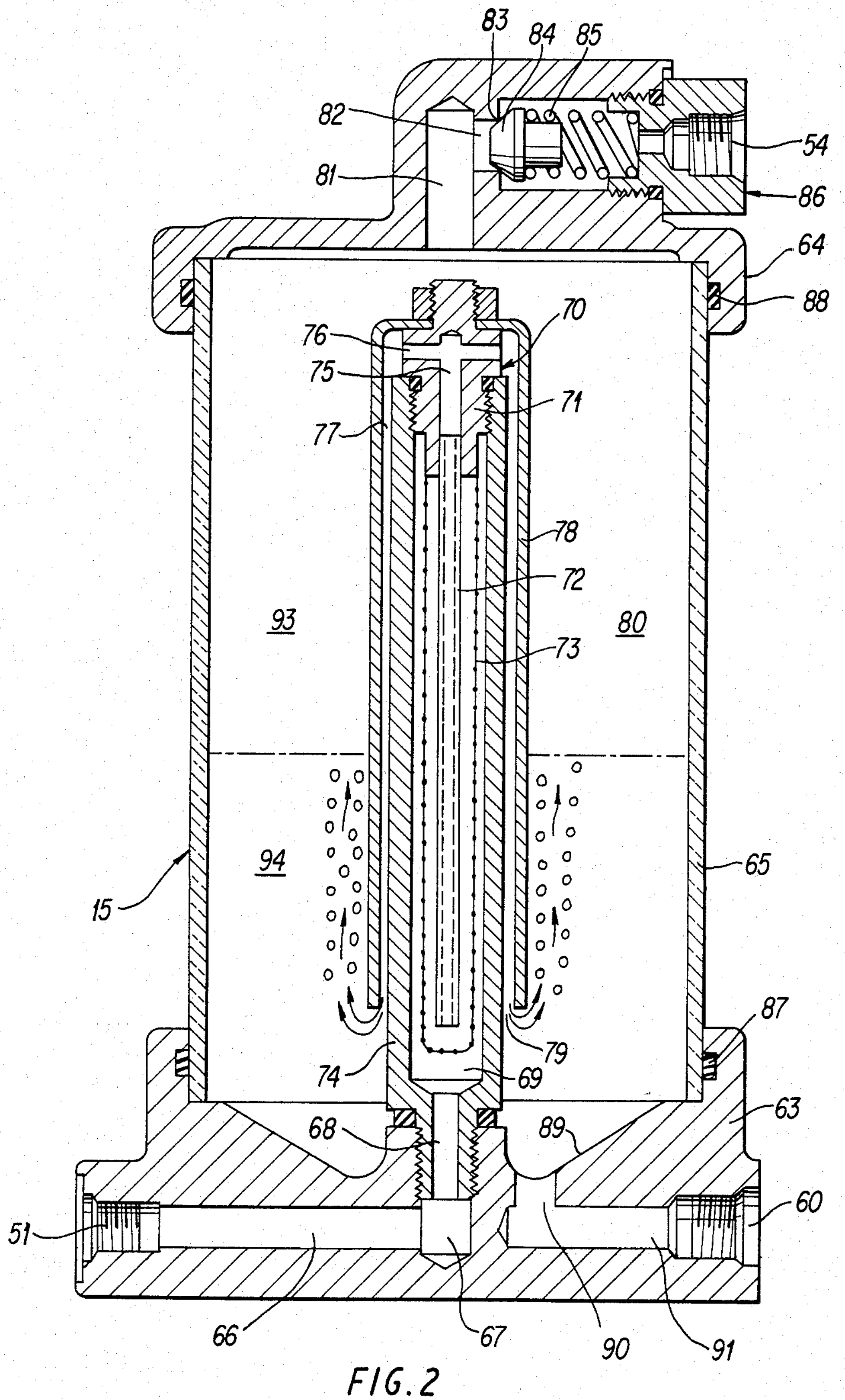
FIG. 2 is a sectional view through the gravity type separator showing the detail of viscous resistance flow device and conventional pressurizing relief valve.

Referring now to FIG. 2, the gravity type separator, generally designated as 15 and diagrammatically shown in FIG. 1, comprises a lower cup 63, provided with port 51 and water discharge port 60, an upper cup 64 provided with port 54 and spacer tube 65, all secured together by external bolts, not shown, Port 51 communicates by passage 66 with inlet space 67, communicating through passage 68 with the assembly of viscous resistance 14, schematically shown in FIG. 1. The oil and water mixture from passage 68 is conducted to cylindrical space 69, housing capillary tube assembly, generally designated as 70. The capillary tube assembly 70 is provided with a fitting 71 with a capillary tube 72 and contaminant screen 73, which projects into space 69, defined by the stem 74. The capillary tube 72, secured to fitting 71, communicates directly with passages 75 and 76, which in turn communicate with the internal space 77, defined by flow shield 78. Internal space 77 communicates through outlet 79 with the internal space 80, defined by spacer tube 65. Internal space 80 communicates through passages 81 and 82 with sealing edge 83, engaged by poppet 84, biased by spring 85. The sealing edge 83, the poppet 84 and the spring 85 constitute a relief valve assembly located in the upper cup 64 and generally designated as 86. The spacer tube 65, which may be of a transparent material, is sealed in respect to the lower cup 63 and the upper cup 64 by seals 87 and 88. Internal space 80 at the lower end is defined by surface 89, communicating by passages 90 and 91 with the water discharge port 60. Internal space 80 is divided by a water-oil miniscus 92 into space 93 containing oil and space 94 containing water.

Figure 3:
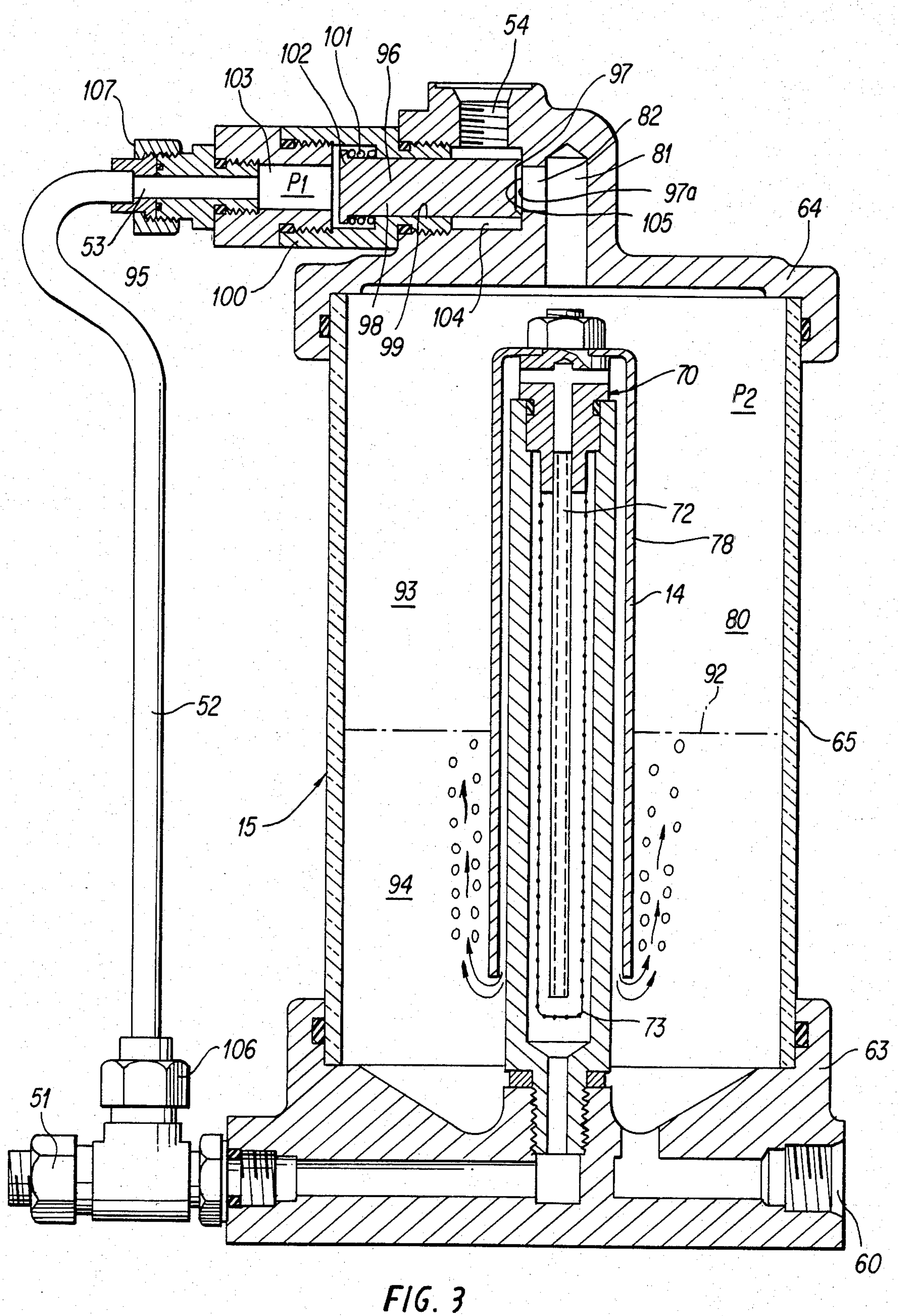
FIG. 3 is a sectional view through the gravity type separator provided with a viscous flow control device and gravity separator pressurizing valve, based on the principle of differential pressure relief valve; and, FIG. 4 shows diagrammatically the centrifugal filter, gravity type separator and system pump mounted on the reservoir with the water extraction device and connecting lines shown schematically.

Referring now to FIG. 3, the gravity type separator 15 of FIG. 1, similar to the gravity type separator of FIG. 2, is shown in sectional view, like components being designated by like numerals. The components of viscous resistance 14 of FIG. 3 are identical to those of FIG. 2 and so is the lower cup 63. The upper cup 64, of the gravity type separator 15, is provided with a differential pressure relief valve assembly, generally designated as 95. The differential pressure relief valve assembly 95 comprises a differential piston 96, provided with a throttling edge 97 and a cylindrical portion 98, guided in sealing engagement by surface 99 in differential sleeve 100. A differential spring 101 is interposed between the differential sleeve 100 and the head portion 102 of the differential piston 96. The head portion 102 of the differential piston 96 projects into space 103, directly communicating with port 53. The throttling edge 97, of differential piston 96, projects into space 104, directly communicating with port 54 and selectively engages sealing surface 105, containing passage 82. Line 52, provided with fittings 106 and 107, connects ports 51 and 53.

Figure 4:
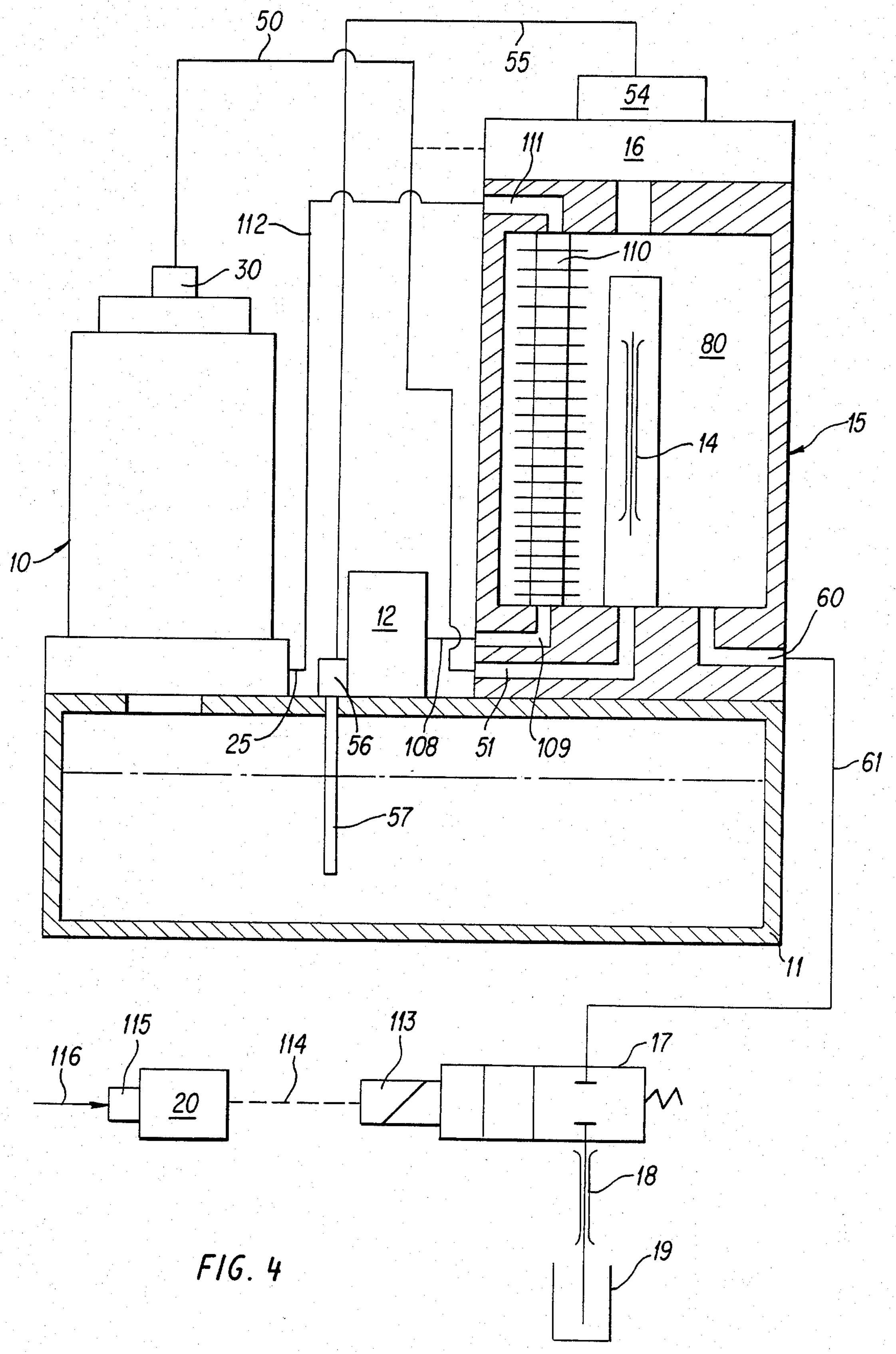

Referring now to FIG. 4, schematically shown centrifugal filter separator 10, pump 12 and gravity type separator 15 are mounted on reservoir 11. Like components of FIGS. 1, 2, 3 and 4 are designated by like numerals. The outlet from the pump 12 is connected by line 108 with port 109, of the gravity type separator 15. Oil under pressure, supplied from the pump 12 to the port 109, is passed through finned heat exchanger tube 110, which is located in space 80, containing water and oil. The outlet of finned heat exchanger tube 110 is connected to port 111, which in turn is connected by line 112 with the inlet 25, of centrifugal filter separator 10. The water extraction circuit of the centrifugal filter separator 10 is connected through centrifugal water extraction fitting 30 and line 50 with the port 51, connected through viscous resistance 14 with space 80. In turn space 80 is selectively connected through water discharge port 60, line 61, on-off solenoid valve 17 and viscous resistance 18 with the water vessel 19. The diagrammatically shown on-off solenoid valve 17, operated by solenoid 113, is connected by electrical conduit 114 with push button control 20, operated by a push button 115, in response to an external control signal 116.

Referring now back to FIG. 1, oil under pressure is supplied from the pump 12 to the inlet 25 of the centrifugal filter separator and reacting on the cross-sectional area of the shaft assembly 34, journalled in the lower internal bearing 26, lifts the drum assembly 24 upwards to a point, at which the upper end of the shaft 40 guided in the upper internal bearing 28, will contact, in sealing engagement, the surface of the reaction washer 31, lining up the passage provided in the reaction washer 31 with the internal passage 39. Since the cross-sectional area of the lower portion of the shaft 40, guided in the lower internal bearing 26 is substantially larger than the upper portion of the shaft 40, guided in the upper internal bearing 28, the drum assembly 24 will remain in this lifted position, as long as pressure oil is supplied to the inlet 25. Oil under pressure is transmitted from the inlet 25, through the oil inlet passage 41 in the shaft 40, to the internal space 43 of the drum assembly 24, from where the oil under pressure is transmitted through strainers 46 and 47 and inlet tubes 44 and 45 to the reaction jet nozzles 35 and 36. In a well known manner, a jet of oil will be ejected through both reaction jet nozzles in opposite directions, providing a reaction torque, which will rotate the drum 24 in bearings 26 and 28, around its vertical axis. Under those conditions the speed of rotation of the drum 24 may exceed, say 5000 revs. per minute, subjecting the oil, contained in space 43 of the drum 24, to centrifugal accelerations in excess of 2000 Gs. In a well known manner, the solid dirt particles in the oil, together with heavy liquids like water will be centrifuged to the internal surface 42 of the drum 24, while clean oil, conducted through the inlet tubes 44 and 45, will be ejected by the reaction jet nozzles 35 and 36 to the space 48, enclosed by the housing 23, which is connected by the oil outlet 27 with the system reservoir 11. Therefore, contaminated oil from the reservoir 11 is recirculated on a containuous basis by the pump 12 through the centrifugal filter separator 10 and recirculated back to the reservoir 11, while some of the solid contaminants and water will be retained within the rotating drum 24.

As previously stated the solid contaminants and the water are centrifuged from the oil, and maintained by the centrifugal forces against the internal surface 42 of the drum 24. The solid contaminants form a layer of thick paste on the surface 42, which may attain a considerable thickness, while the centrifuged water forms another layer, maintained by centrifugal force on top of the layer of solid contaminants. Periodically the drum assembly 24 is disassembled and the layer of solid contaminants removed from the surface 42.

The centrifuged water can be extracted from the rotating drum 24 during operation of the centrifugal filter separator 10. With the passage through the centrifugal water extraction fitting 30 open and the shaft 40 maintained in sealing engagement with the reaction washer 31, the centrifuged water, collected in the form of a layer on the surface 42, will be passed through the water extraction tubes 38 to the internal passage 39 and therefore out of the rotating drum 34. The outer ends of the water extraction tubes 38 are maintained in close proximity in respect to the inner surface 42, so that the maximum amount of water can be extracted.

The centrifuged water, passed through the water extraction tubes 38, will collect a small amount of solid contaminants from the internal surface 42, maintaining the internal surface 42, in the vicinity of the ends of the water extraction tubes 38, relatively clear of solid contaminants and with free access to the layer of centrifuged water.

With the water passage in the centrifuged water extraction fitting 30 closed, after a certain maximum quantity of centrifuged water is allowed to collect in the rotating drum 24, the centrifugal filter loses its effectiveness, in a continuous manner by passing additional centrifuged water back to reservoir 11. If on the other hand the water is extracted from a thin layer collected at the inner surface 42 of the rotating drum 24, the water extracting tubes 38, during the water ejection process, pass a water-oil mixture, resulting in a comparatively large loss of oil. Since it is very difficult to determine the quantity of water, at a time, centrifuged within the rotating drum 24, it is very difficult, if not impossible, to efficiently drain the water without losing a significant quantity of oil in the process. Such a loss of oil is not only expensive, but with the centrifugal filter operating for a prolonged period, the loss of oil may make the system inoperative.

In the arrangement of FIG. 1 a small controlled quantity of oil-water mixture is drained on a continuous basis from the inner surface 42 of the rotating drum 24 and passed through line 50 and viscous resistance 14 to port 51 of the gravity type separator 15. As will be shown and described in detail, when referring to FIGS. 2, 3 and 4, with viscous resistance 14, located inside the gravity type separator 15, the water-oil mixture is separated inside the gravity type separator and the separated oil returned, on a continuous basis, from port 54 and the line 55 to the oil injection fitting 56. The quantity of oil extracted from the centrifugal filter separator 10 and passed through the gravity type separator 15 is comparatively small in the order of a few hundred cubic centimeters per minute, while the flow through the pump 12 is comparatively large, in the order of a number of gallons per minute. The oil injection fitting 56, which might be provided with an injection venturi type device, well know in the art, will introduce into the oil, supplied from the reservoir 11, the full quantity of liquid, discharged from the separator, which will carry a quantity of solid contaminants and may carry, as will be described later in the text, when referring to FIGS. 2, 3 and 4, a quantity of small water droplets, or oil-water emulsion, not precipitated in the gravity type separator. Therefore, in this way, with excess oil all of the solid contaminants and unprecipitated water droplets are suppled to the gravity type separator and are introduced, on a continuous basis, directly back into the centrifugal filter separator 10, where those contaminants in the form of solid particles and water, are redeposited on the surface 42 of the rotating drum 24, without contaminating the oil in the reservoir 11 and making sure that none of the oil from the reservoir 11 is being lost, during the water extraction process.

The quantity of water is continuously increasing in the gravity filter separator 15 and retained outside of the centrifugal filter system. A visual indication of the quantity of water, retained in the gravity type separator 15, is provided, so that, at an appropriate time, by activation of the push button 20 and the solenoid valve 17, the collected water can be evacuated from the gravity type separator 15 to the water vessel 19.

Referring now to FIG. 2 a mixture of oil and water is supplied to port 51 of the gravity type separator 15, schematically shown in FIG. 1. This continuous flow of water-oil mixture is extracted from the vicinity of the internal surface 42, of the drum assembly 24 through the water extraction device 37, see Fig. 1. As described when referring to FIG. 1, the centrifuged water, maintained by centrifugal force against the internal surface 42, is drained off by the water extraction device 37 with comparatively large quantities of oil being drawn from the drum assembly 24. The extracted water is in the form of well defined droplets, varying in size from comparatively large to very small, depending on the thickness of the layer of water, centrifuged at the inner surface 42. Those water droplets, suspended in oil, flow from port 51 through passages 66 and 68, space 69, contaminant screen 73, capillary tube 72, passages 75 and 76 and annular internal space 77 to outlet 79 and internal space 80 of the gravity type separator 15. The pressure in the internal space 80 is determined by the setting of the relief valve assembly 86, as determined by the preload of the spring 85. The pressure setting of the relief valve assembly 86 is so selected that it is lower, by a certain selected pressure differential, than the pressure in the port 51, which in turn is determined by the setting of the relief valve 13 of pump 12, see FIG. 1. This pressure differential, maintained at a relatively constant level, during operation of the gravity type separator 15, results in a specific flow through the viscous resistance of the capillary 72. The resulting flow of the oil-water mixture is slowly ejected through the outlet 79, located near the bottom part of the gravity type separator 15. The water droplets, under the force of gravity, migrate downwards to the surface 89, eventually forming a distinct miniscus 92, as shown by the dotted line. The water droplets in the water-oil mixture join the volume of water 94, positioned below the miniscus 92, while the globules of oil rise through the water, pass through the miniscus 92 and join the volume of oil 93, which forms above the miniscus. In its state of floating equilibrium the relief valve assembly 86 maintains the internal space 80 at a preselected pressure level, while passing a quantity of oil from space 93, equal to the quantity of oil-water mixture introduced through capillary tube 72 to space 94. The relief valve assembly 86 is connected by line 55 to the oil injection fitting 56, which introduces the recirculated oil into the inlet of pump 12 and therefore into the rotating drum assembly 24 of the centrifugal filter separator assembly 10. The flow of the oil-water mixture, into the gravity type separator 15, is introduced at such a rate that the maximum efficiency of separation between the water and oil is attained and only a small quantity of very small water droplets is carried into oil space 93 and through oil injection fitting 56 back into the inlet of the centrifugal filter separator assembly 10. These very small water droplets are centrifuged to the internal surface 42, form a thin cylindrical layer of water and are introduced in a larger form back into the gravity type separator 15. The efficiency of the separation of water from oil is influenced by the percentage of water contained in the oil and by the oil viscosity. The lower the viscosity the higher the efficiency of separation and the higher the flow through the gravity type separator 15, that can be separated. The higher the percentage of water, the higher the separation efficiency and the higher the volume of oil-water mixture, that can be passed through the gravity type separator, for optimum separation condition. Since the flow through the capillary tube 72 is directly proportional to the pressure differential, developed across it and maintained constant by the relief valve assembly 86 and inversely proportional to the viscosity of the liquid passing through it, with the increasing ratio of water to oil in the mixture and with the decrease in viscosity of oil, due to rise in its temperature, the flow through the gravity type separator is automatically increased, maintaining the separation efficiency high, while separating the optimum quantity of water. As the separation of water from oil progresses the miniscus 92 will rise and the position of the miniscus can be observed through the transparent spacer tube 65. Once the miniscus 92 will approach the top part of the gravity type separator 15, the push button control 20 of FIG. 1 is activated, in turn connecting, through the solenoid valve 17, the bottom part of space 94 filled with water, with the water vessel 19. The pressure inside the gravity type separator 15 drops to near atmospheric pressure, the relief valve assembly 86 closes and under full pressure differential, equal to pressure developed in pump 12, the flow through capillary at a maximum rate displaces the water from the gravity type separator. Under these conditions mostly oil with very little water fills the gravity type separator, while the water-oil miniscus 92 drops to any desired level.

Therefore, under working conditions water-oil separation takes place inside the gravity type separator, with the water retained in the separator, while the oil, in which solid contaminants and small water droplets may be carried, is returned back to the inlet of the centrifugal filter separator, completely eliminating any loss of oil, during the water extraction process. This water extraction process takes place at optimum efficiency of extraction, with the flow through the capillary maintained at a constant pressure differential, correcting the through-flow through the viscosity effect of the oil-water mixture. Once a sufficient quantity of water is collected inside the gravity type separator 15, this water, in a manner as previously described, is drained into the water vessel 19 without any loss of oil.

If the miniscus 92 would reach the top of the separator, at first the water-oil mixture would be discharged through the relief valve assembly 86 and, in a manner as previously described, introduced back through the oil injection fitting 56 into the rotating drum assembly 24, where the introduced water would be automatically centrifuged to the internal surface 42, increasing gradually the thickness of the layer of the centrifuged water within the rotating drum. An equilibrium condition would be reached, in which water only would be continuously recirculated from the centrifugal filter separator assembly 10 to the gravity type separator 15, with the thickness of the water layer, centrifuged in the centrifugal filter separator, reaching a maximum thickness, at which the water, centrifuged from the oil, would be recirculated back through the oil outlet 27 into the reservoir 11, see FIG. 1. Under those conditions, once the solenoid valve 17, through the push button 20 of FIG. 1, will connect the inside of the gravity type separator 15 with the water vessel 19 all the water from the gravity type separator 15 and all of the water centrifuged and retained in the rotating drum 24 will be ejected and the water-oil miniscus formed and lowered to any desired level, without any loss of oil whatsoever from the total separating circuit.

The differential piston 96 with its throttling edge 97, as described when referring to FIG. 3, positions itself in respect to the sealing surface 105, to assume a throttling position, to maintain a constant pressure differential, acting across the capillary tube 72 at a constant preselected level as dictated by the preload of the differential spring 101. Since, as previously described, it is to an advantage to work in the region of small controlled pressure differentials, the differential spring 101 may be selected with low preload. With solid contaminants present, between the surface 99 and the differential piston 96, during the initial start-up the differential piston 96 may get stuck in closed position, disrupting flow, and the differential spring 101 may be too weak to move it. To guard against such an occurrence, in systems working with a low pressure differential, the throttling edge 97 can be provided with notched orifices 97*a* with sufficient flow area to provide, say 75% of flow through the capillary tube under rated conditions. During the unloading cycle, due to low pressure in internal space 80, only minimal flow will be conducted to the pump inlet. During normal operating conditions, even with the differential piston 96 stuck in its closed position, 75% of the rated flow, at rated conditions, will be recirculated. Sticking of the differential piston 96, in any other intermediate position, other than fully closed, is very unlikely, since the large force, due to large pressure differential equal to P1 pressure, becomes available to move it at the beginning of each starting cycle.

In FIG. 2 the viscous resistance 14 is shown positioned in internal space 80, of the gravity type separator 15. As schematically shown in FIG. 1 the viscous resistance 14 can be located outside of the gravity type separator 15, if the outlet 79, of the capillary tube 72, is connected to port 51 then oil-water mixture will be conducted through passage 66 and inlet space 67 to internal space 80 of the gravity type separator 15. Under those conditions the stem 74, the fitting 71 and the flow shield 78 can be used without the capillary tube 72, positioned in the stem 74.

Referring now to FIG. 3, the gravity type separator 15 uses the same lower cup 63, spacer tube 65 and capillary tube assembly 70, as the gravity type separator of FIG. 2. There is however, one essential difference. The gravity type separator of FIG. 3 uses the differential pressure relief valve assembly 95, connected by line 52 with port 51, instead of using the relief valve assembly 86 of FIG. 2. As described when referring to FIGS. 1 and 2, the relatively constant pressure differential, acting across the capillary tube 72 of FIG. 2, is established by the difference in pressure setting of the relief valve 13 of the pump 12 of FIG. 1 and the pressure setting of the relief valve assembly 86 of FIG. 2. As is well known in the art, the pressure settings of the relief valve may vary from assembly to assembly, varying to a small degree, the value of the pressure differential, developed across the capillary tube 72. Some small variations in pressure in the water extraction device 37 can also take place under different working conditions of the centrifugal filter separator assembly 10. Those small variations in the pressure differential, developed across the capillary tube 72, not only, to a small degree, affect the flow through the capillary and therefore the efficiency of separation, but, what is more important, make the use of very small pressure differentials, controlled across the capillary tube 72, impractical. There is one distinct advantage in using small pressure differentials across the capillary, since under those conditions the internal diameter of the capillary can be made comparatively large, minimizing the possibility of the capillary being blocked or silted up by contaminants and also permitting use of the much coarser contaminant screen 73.

The differential pressure relief valve assembly 95 of FIG. 3 permits selection of very small pressure differentials, acting across the capillary tube 72, possible, maintaining this differential constant, irrespective of the changes in working conditions in the centrifugal filter assembly 10 and the setting of the relief valve 13 of FIG. 1. Differential piston 96, of the differential pressure relief valve assembly 95, is subjected on one end to the pressure in port 51, which is conducted by line 52 to the space 103 and on the other side to the pressure in the space 80 of the gravity type separator 15. The pressure in space 80 is equal to the pressure in port 51, less the pressure drop developed, due to flow through the viscous resistance of the capillary tube 72, the losses, due to flow through other passages of viscous resistance 14, being negligible. The differential piston 96 is provided with a throttling edge 97, working in cooperation with the sealing surface 105. The area enclosed by the throttling edge 97 very closely approaches the cross-sectional area of the differential piston 96. Differential piston 96 is biased in the direction, away from the sealing surface 105 by differential spring 101. Assume that pressure in the inlet port 51 and space 103 equals P1 and that the pressure in space 80 equals P2. Therefore the pressure differential ΔP acting across the viscous resistance 14 and capillary tube 72 equals P1−P2. During starting condition, with P1 applied to space 103 and P2 equal to zero, the differential piston 96 will move from left to right, compressing the differential spring 101 and engaging with throttling edge 97 sealng surface 105. With rising P2 pressure the differential piston 96 will move away from sealing surface 105, into an equilibrium throttling position, automatically maintaining P2 pressure, lower by a constant pressure differential ΔP, than P1 pressure, this pressure differential being equal to the quotient of the preload in the differential spring 101 and cross-sectional area of the differential piston 96. Therefore, this pressure differential ΔP represents the flow loss through the capillary tube 72, due to specific flow at specific viscosity of the liquid, this pressure differential always maintained constant due to the throttling action of the throttling edge 97, of the differential piston 96, as dictated by the preload in the differential spring 101. Therefore, through its throttling action, the differential pressure relief valve assembly 95 will always maintain a constant pressure differential ΔP across the capillary tube 72, irrespective of the variation in the magnitude in P1 pressure, ensuring that the flow through the capillary tube 72 is always inversely proportional to the viscosity of the liquid flowing through it. In this way, as explained when referring to FIG. 2, the flow through the gravity type separator 15 will be adjusted by the ratio of oil to water mixture and by the temperature of oil, maintaining the optimum separation efficiency and optimum quantity of separated water. Since the pressure differential, acting across the capillary resistance, through the use of the differential pressure relief valve assembly 95, is made completely independent of P1 pressure and is only dictated by the preload in the differential spring 101, the value of the pressure differential can be selected low, permitting the use of contamination tolerant, comparatively large internal diameter capillary tubing.

As already stated the pressure differential, developed across the capillary tube 72, is maintained constant by the throttling action of the differential piston 96. The flow of oil from space 93, located above the miniscus 92, past the throttling edge 97 into space 104 and port 54 will always be equal to the flow of water-oil mixture through the capillary tubing, under the condition of constant pressure differential, maintained across it. As described, when referring to FIGS. 1 and 2, the port 54 is connected by line 55 of FIG. 1 to the oil injection fitting 56. In this way the separated oil, from the gravity type separator 15, is continuously returned to the inlet of the centrifugal filter separator 10.

During the water ejection cycle, as described when referring to FIG. 2, P1 pressure will remain relatively unchanged while P2 pressure will approach near atmospheric pressure. With the water discharge port 60 connected by solenoid valve 17 to the water vessel 19 of FIG. 1 full pressure differential, approximately equal to P1 pressure, will be developed across capillary tube 72, greatly increasing the flow through it. Under those conditions differential piston 96, subjected to this large pressure differential, will move into a position completely isolating oil in space 93 from port 54, while the water is evacuated from the gravity type separator 15 at this maximum rate. Once the water rejection cycle is terminated, the differential piston 96 will automatically move into its modulating throttling position, throttling the flow from space 93, to maintain a constant pressure differential across the capillary tube 72.

In FIG. 3 the viscous resistance 14 is shown positioned in internal space 80 and includes the capillary tube 72. As schematically shown in FIG. 1 the viscous resistance 14, in the form of the capillary tube 72, can be positioned between the fitting 106 and the lower cap 63, while retaining the flow shield 78 and its supporting members inside internal space 80 of the gravity type separator 15. The operation of the differential relief valve assembly 95 will be identical to that of FIG. 3, automatically maintaining a constant pressure differential across externally positioned viscous resistance 14.

Referring now to FIG. 4, the centrifugal filter separator 10, the pump 12 and the gravity type separator 15 are shown mounted on the system reservoir 11. The centrifugal filter separator 10 and the pump 12 of FIG. 4 are identical to those described when referring to FIG. 1. The gravity type separator 15 can be of a type, as described when referring to FIG. 2, or of a type as described when referring to FIG. 3, provided with an identical schematically shown viscous resistance 14. The finned heat exchanger tube 110 is passed through space 80 of the gravity type separator 15. The full discharge flow of the pump 12, delivered through line 108 and port 109, is circulated through the finned heat exchanger tube 110, delivered to port 111 and supplied through line 112 to inlet 25 of the centrifugal filter separator 10. In this way the liquid, contained in space 80, is heated by the finned heat exchanger tube 110, increasing the temperature of the water-oil mixture, flowing through the viscous resistance 14. Increasing the temperature and reducing the viscosity of the oil, as described when referring to FIG. 2, increases the separation efficiency of the water-oil mixture.

The water, separated in the gravity type separator 15, can be evacuated from space 80 in the following manner. A manual or other type of control signal 116 can be applied to push button 115, of the push button control 20. In a well known manner, the electrical signal is transmitted through the electrical conduit 114 to the solenoid 113 of the solenoid type on-off valve 17. The solenoid valve 17 will then connect space 80, through water discharge port 60 and line 61, to viscous resistance 18, interposed between solenoid valve 17 and the water vessel 19. As long as water is passing through the viscous resistance 18, the flow will be high, even with very low pressure in space 80. If the water becomes fully evacuated and the oil will start flowing through the viscous resistance 18, the flow through the viscous resistance 18 will be reduced by the ratio of the viscosity of oil to the viscosity of water, which may be as high as forty to one. In this way the viscous resistance 18, positioned down stream of the solenoid valve 17, will ensure that only a negligible quantity of oil will be lost, during the water ejection cycle from the gravity type separator.

Although the preferred embodiments of this invention have been shown and described in detail it is recognized that the invention is not limited to the precise form and structure shown and various modifications and rearrangements as will occur to those skilled in the art upon full comprehension of this invention may be resorted to without departing from the scope of the invention as defined in the claims.

What is claimed is:

1. A centrifugal filter separator system comprising a stationary housing having an inlet port supplied with pressurized oil by a pump having a suction port connected to a reservoir, a clean oil outlet port connected to said reservoir, a centrifuged water port, and a rotatable drum journalled in said housing and functionally connected with said inlet port, said clean oil outlet port and said centrifuged water port, gravity type separating means having flow resistance means interconnected to said centrifuged water port, pressurizing means of said gravity type separating means operable to maintain a relatively constant pressure differential across said flow resistance means and oil conducting means down stream of said pressurizing means interconnected to exhaust means whereby oil-water mixture supplied from said centrifuged water port can be separated into oil and water, said water retained in said gravity type separator and said oil returned to said exhaust means.

2. A centrifugal filter separator system as set forth in claim 1 wherein said pressurizing means includes relief valve means operable to limit pressure in said gravity type separating means to a certain preselected maximum level.

3. A centrifugal filter separator system as set forth in claim 1 wherein said pressurizing means includes differential pressure relief valve means operable to maintain a relatively constant pressure differential across said flow resistance means.

4. A centrifugal filter separator system as set forth in claim 1 wherein said flow resistance means includes first capillary type means and contaminant screening means.

5. A centrifugal filter separator system as set forth in claim 1 wherein said exhaust means includes said reservoir.

6. A centrifugal filter separator system as set forth in claim 1 wherein said exhaust means includes said suction port of said pump.

7. A centrifugal filter separator system as set forth in claim 1 wherein said gravity type separating means includes separated water ejection means.

8. A centrifugal filter separator system as set forth in claim 7 wherein said separated water ejection means includes a solenoid valve means responsive to an external control signal and operable to selectively interconnect said gravity type separating means with a separated water collecting means.

9. A centrifugal filter separator system as set forth in claim 8 wherein said water ejection means includes a second capillary tube means down stream of said solenoid valve means.

10. A centrifugal filter separator system as set forth in claim 1 wherein said gravity type separating means includes heat transfer means operable to reduce viscosity of the liquids contained in said gravity type separating means.

11. A centrifugal filter separator system as set forth in claim 1 wherein said flow resistance means includes viscous resistance means.

12. A centrifugal filter separator system as set forth in claim 11 wherein said viscous resistance means includes capillary tube means.

* * * * *